No. 678,440. Patented July 16, 1901.
M. A. SMITH.
SUGAR MELTER.
(Application filed Mar. 13, 1900.)
(No Model.)

WITNESSES:

INVENTOR
Myron A. Smith
BY A. M. Pierce,
ATTORNEY.

UNITED STATES PATENT OFFICE.

MYRON A. SMITH, OF NEW YORK, N. Y., ASSIGNOR TO INTERNATIONAL MACHINE CO., OF SAME PLACE.

SUGAR-MELTER.

SPECIFICATION forming part of Letters Patent No. 678,440, dated July 16, 1901.

Application filed March 13, 1900. Serial No. 8,437. (No model.)

*To all whom it may concern:*

Be it known that I, MYRON A. SMITH, a citizen of the United States, residing in the city, county, and State of New York, have invented a new and useful Improvement in Sugar-Melters and Syrup-Coolers, of which the following is a specification.

My invention relates especially to devices employed in the manipulation of sugar in the manufacture of confectionery, and has for its object the provision of a sugar-melter and syrup-cooler very simple in construction and effective in operation.

To attain the desired end, my invention consists, essentially, in a vessel provided with a perforated bottom, in combination with a chamber therebeneath provided with a top having perforations therein corresponding to the perforations in the vessel-bottom, a steam or air supply, or both, communicating with the chamber beneath the vessel-bottom, and means for changing the relative position of the perforated vessel-bottom and the chamber-top, all of which will be hereinafter first fully described and then pointed out in the claims.

Figure 1:
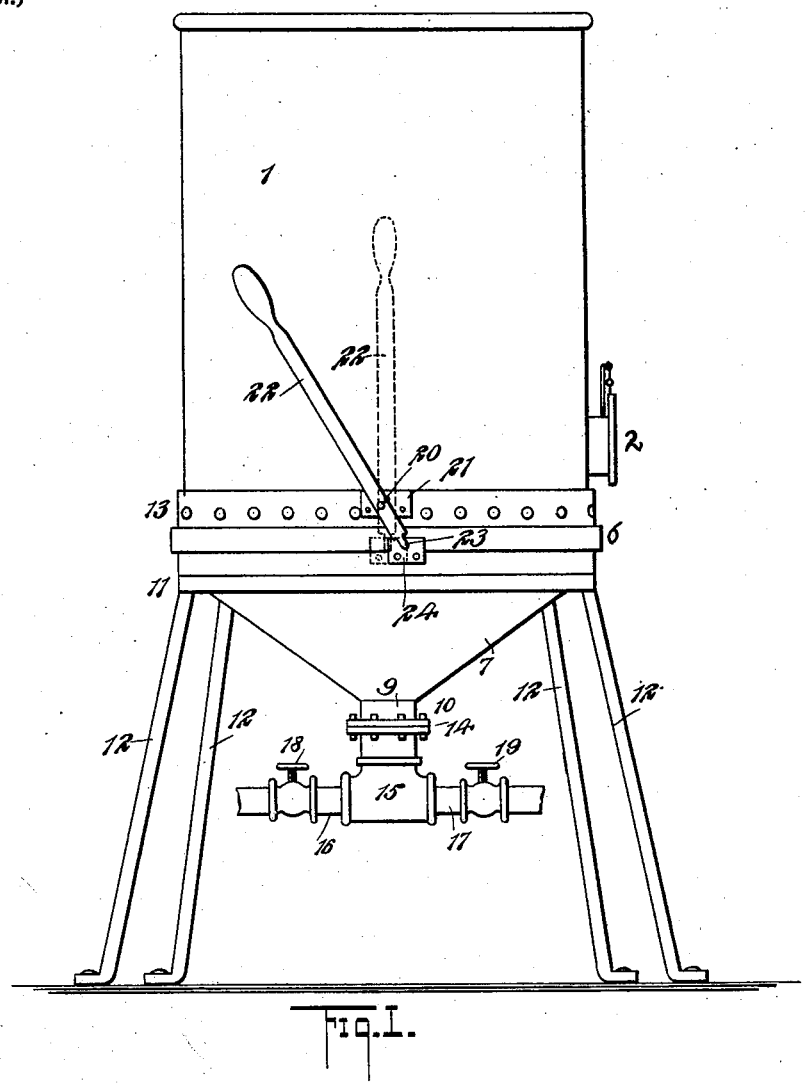
Figure 2:
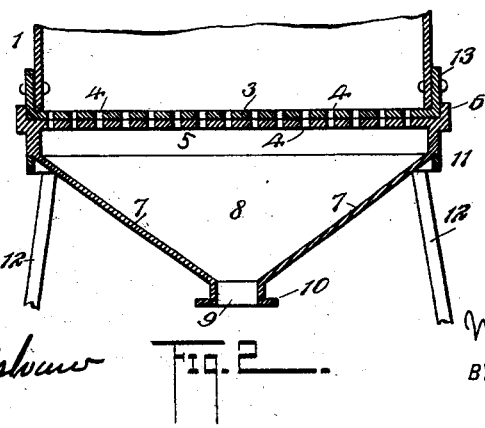

In the accompanying drawings, forming a part hereof, Figure 1 is a side elevation of my improved sugar-melter and syrup-cooler, and Fig. 2 is a vertical axial sectional view thereof.

Similar numerals of reference wherever they occur indicate corresponding parts in both figures.

1 is a vessel or tank made of copper or any other approved material.

2 is a valve located at the side of the vessel for the purpose of removing the contents after manipulation.

3 is a bottom of the vessel 1, either formed therewith or consisting of a plate provided with an upturned edge 13 at its periphery for riveting to the wall of the vessel. The bottom 3 is provided with minute perforations 4.

5 is the top of a chamber 8, preferably formed with sloping walls 7 and peripherally upturned edge 6. The top 5 is provided with perforations 4, corresponding in location to the perforations 4 in the bottom plate 3, the lower extremity of the vessel fitting snugly within the upturned edge 6 of the top plate 5, as particularly illustrated in Fig. 2 of the drawings.

11 is a supporting-ring provided with sustaining-legs 12.

The chamber 8 is provided with a ring 9 at the bottom, having a flange 10 for engaging with a flange 14 upon a pipe connection 15.

16 is a pipe having a regulating-valve 18, said pipe communicating with any source of air-supply, and 17 is a similar pipe provided with a valve 19, this pipe communicating with a steam-supply.

Pivoted at 20 on a block 21 is a lever 22, terminating at its lower extremity in a finger 23, which engages with a slotted block 24, fixed to the support upon which the vessel 1 rests. I do not, however, confine myself to the exact details of construction shown, as they may be varied without departing from the spirit of my invention.

When constructed and arranged in substantial accordance with the foregoing description, the operation of my invention is as follows: Sugar is placed in the vessel 1, said vessel having been turned upon its support in and upon parts 5 and 6 by means of the lever 22, so as to bring the perforations 4 in the plates 3 and 5 out of register with each other. Steam is now admitted to the chamber 8 and the vessel 1 moved, by means of the lever, sufficiently to cause the perforations 4 to register, admitting a blast of steam in minute and widely-distributed streams beneath the mass of sugar, quickly melting the same to a syrup. The perforations 4 are now brought out of register, the steam shut off, and a blast of air is substituted therefor and the vessel 1 turned, so as to admit the same beneath the syrup, rapidly reducing its heat to the desired temperature for drawing off after the perforations have been turned out of register. If desired, sugar which has been already melted before placing it in the vessel 1 may be cooled in the same manner, in which case the use of the steam is dispensed with.

Having now fully described my invention, what I claim as new therein, and desire to secure by Letters Patent, is—

1. In a device of the character herein specified, a vessel the bottom whereof is provided with perforations, a chamber therebeneath the top whereof is provided with corresponding perforations, means for changing the relative positions of said perforations by partially rotating the vessel 1, and means for supplying air or steam or both to the chamber beneath the said vessel, the whole combined and arranged to operate substantially as shown and described.

2. In a device of the character herein specified, a vessel provided with a perforated bottom, in combination with a chamber therebeneath having a top correspondingly perforated, means for changing the relative position of said perforations by partially rotating the vessel 1, and for supplying a manipulating-blast, substantially as shown and described.

3. A sugar melting and cooling device in which are comprised a vessel or tank provided with a perforated bottom, a chamber therebeneath the top whereof is perforated, means for supplying a manipulating-blast to said chamber, and means for partially rotating the vessel or tank above said chamber, substantially as and for the uses and purpose shown and described.

Signed by me at New York this 10th day of March, 1900.

MYRON A. SMITH.

Witnesses:
 THOS. F. A. GIBNEY,
 A. M. PIERCE.